Aug. 21, 1923.
R. J. LYMAN
FLUID METER
Filed Dec. 28, 1921
1,465,447
2 Sheets-Sheet 1
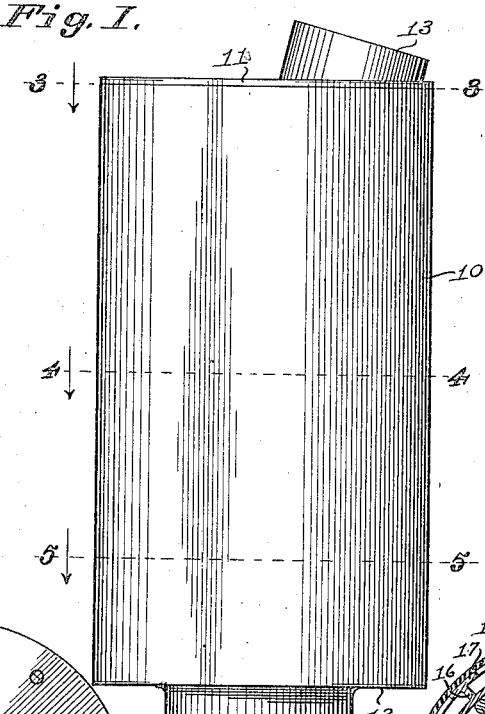
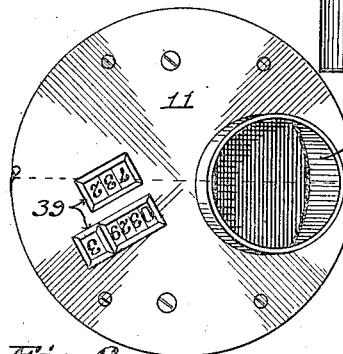
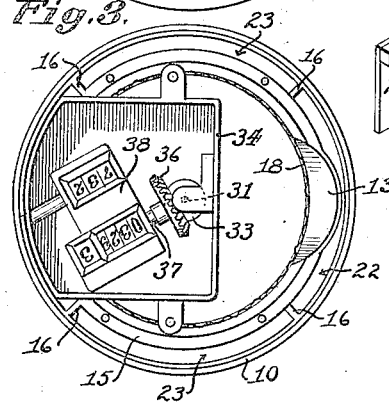
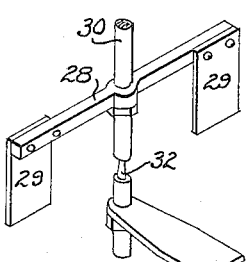
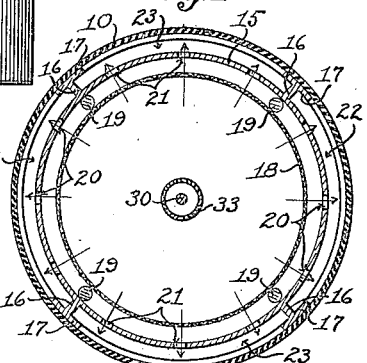
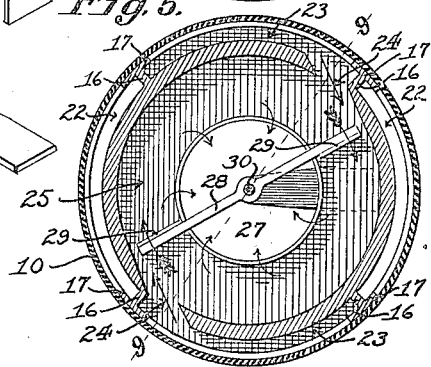
Inventor.
Ray J. Lyman,
By Booth & Booth
Attorneys.

Aug. 21, 1923.
R. J. LYMAN
FLUID METER
Filed Dec. 28, 1921
1,465,447
2 Sheets-Sheet 2
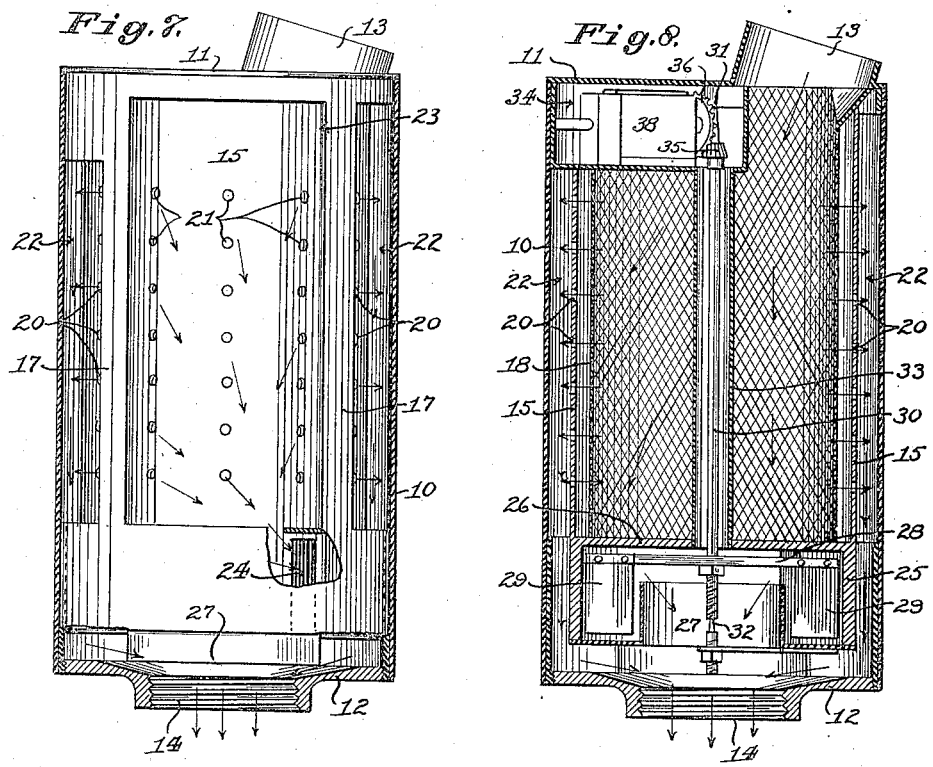
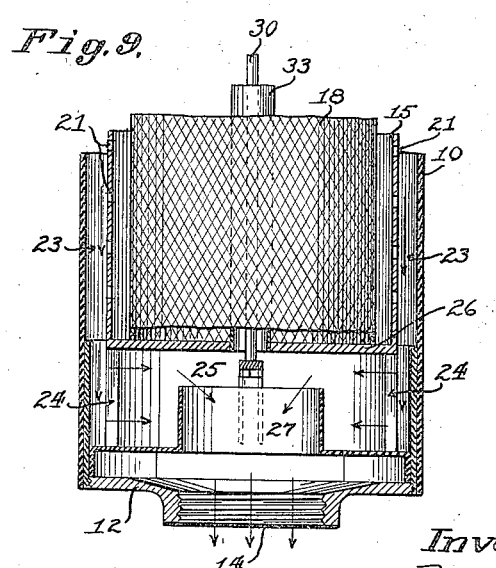
Inventor.
Ray J. Lyman
By Borth & Borth
Attorneys.

Patented Aug. 21, 1923.

1,465,447

UNITED STATES PATENT OFFICE.

RAY J. LYMAN, OF BERKELEY, CALIFORNIA, ASSIGNOR TO GREAT WESTERN METER CO., OF SAN FRANCISCO, CALIFORNIA, A CORPORATION OF CALIFORNIA.

FLUID METER.

Application filed December 28, 1921. Serial No. 525,274.

*To all whom it may concern:*

Be it known that I, RAY J. LYMAN, a citizen of the United States, residing at Berkeley, in the county of Alameda and State of California, have invented certain new and useful Improvements in Fluid Meters, of which the following is a specification.

My invention relates to fluid meters, and more particularly to a meter especially adapted for the volumetric measurement of flowing liquids.

The objects of my invention are to provide a device of the described type which is compact, simple in construction, and accurate in operation, and which may be easily taken apart for cleaning and repair. To this end my invention comprises, broadly, a shell having two separate fluid passages therethrough, one of which has associated with it a device for registering the volume of fluid passing through it. By establishing the proper ratio between the amounts of fluid passing through the registering and the non-registering passages, and by constructing the registering mechanism accordingly, said mechanism is caused to register the total amount of fluid passing through both passages.

On account of its compact size and simple construction, my meter has a wide variety of uses, such for example as measuring gasoline as delivered from a storage tank or tank wagon, measuring milk flowing from a separator, or in fact, in any situation where the volumetric measurement of a flowing liquid is desired. Although my invention, in its preferred embodiment, as herein illustrated and described, comprises a free-flow meter, designed to operate in positions in which it will not be subject to back-pressure, I do not wish to be limited thereto, for, as will become obvious from the following description, my meter may be readily adapted to operate under pressure, without departing from the spirit of the invention. Similarly, other changes in the form and construction of the device may be made, within the scope of the claims hereto appended, without affecting the essentials of the said invention.

With this in view my fluid-meter will now be fully described with reference to the accompanying drawings, wherein—

Fig. 1 is an exterior side elevation of my fluid meter.

Fig. 2 is a top plan of the same.

Figs. 3, 4 and 5 are sectional plan views respectively taken on the lines 3—3, 4—4 and 5—5 of Fig. 1.

Fig. 6 is a perspective detail of the turbine rotor and its lower supporting bearing.

Fig. 7 is a side elevation with the outer shell broken away.

Fig. 8 is a vertical section taken approximately on the line 8—8 of Fig. 2.

Fig. 9 is a vertical section of the lower portion of my fluid meter, taken approximately on the line 9—9 of Fig. 5, the turbine rotor being omitted for the sake of clearness.

In the drawings, the reference numeral 10 designates an outer shell, preferably cylindrical, whose ends are closed by removable plates 11 and 12. The top plate 11 is provided with a fluid inlet 13, and the bottom plate 12 with a fluid outlet 14. Within the shell 10, and spaced therefrom, is an inner cylindrical wall 15. The annular space between said wall 15 and the outer shell 1 is divided by radially disposed vertical partitions 16, Figs. 3 and 4, into a series of compartments. In the form of my device illustrated in the drawings, I have shown four such partitions 16, but more or less may be provided if necessary. Said partitions 16, in addition to dividing the annular space between the shell 10 and the inner cylinder 15 into separate compartments, also act as spacers to hold said inner cylinder in concentric spaced relation to said shell. They are preferably secured to said inner cylinder, and have arcuate flanges 17, Figs. 4 and 7, which fit closely within the shell. Upon the removal of either end plate 11 or 12, the inner cylinder 15 with the partitions 16 may be drawn out from the shell for cleaning or repairs.

The inner cylinder 15 contains a cylindrical screen 18, Figs. 4, 8 and 9, preferably spaced from its wall by vertical members 19, Fig. 4. The fluid inlet 13, as shown in Fig. 8, directs the incoming fluid into the interior of said cylindrical screen 18. The wall of the inner cylinder 15 is perforated by a plurality of relatively small apertures 20 and 21, Figs. 4 and 7, which enable the fluid to pass into the compartments 22 and 23 of the annular space between said inner cylinder and the shell 10. Said compartments are divided into two groups, the two compartments 22 being opposite each other, and separated by the other two compartments 23. The compartments 22 extend to the lower end of the shell 10, and form vertical passages having free communication with the outlet 14, as shown in Fig. 8. The compartments 23 terminate at their lower ends in tangential openings 24, Figs. 5 and 9, leading into an annular turbine chamber 25 formed below the inner cylinder 15 and secured thereto. Said turbine chamber 25 is separated from the inner cylinder 15 by a horizontal plate 26, Figs. 8 and 9, and is provided with a central outlet 27, Figs. 5 and 9, positioned above and in free communication with the main fluid outlet 14.

The turbine chamber 25 contains a rotatable member comprising a cross bar 28, Figs. 5, 6 and 8, to which are attached two oppositely disposed blades or vanes 29, positioned to be impinged against by the fluid entering through the tangential openings 24. The cross bar 28 is fixed upon a vertical shaft 30, which has upper and lower pivotal bearings 31 and 32, Fig. 8, respectively. Said shaft passes through a central tube 33 in the inner cylinder 15, and extends into a chamber 34 beneath the cover plate 11. A bevel gear 35, carried by the upper end portion of said shaft 30 meshes with a similar gear 36 mounted on the operating shaft 37 of a registering mechanism 38. Said registering mechanism is mounted in the chamber 34, as shown in Figs. 3 and 8, and its dials and figures are visible through apertures 39, Fig. 2, formed in the cover plate 11. The registering mechanism 38 may be of any well known and suitable construction and is therefore not shown in detail in the drawings.

It will be seen from the foregoing that the fluid, after entering the inner cylinder 15, is divided into two separate streams, one flowing through the apertures 20 into the compartments or passages 22, and thence directly to the outlet 14, and the other flowing through the apertures 21 into the passages 23, and thence through the turbine chamber 25 to the outlet 14. The registering mechanism is actuated only by the last mentioned portion of the fluid, but said registering mechanism is so constructed, and the apertures 20 and 21 are so proportioned, that said mechanism registers in terms of whatever unit may be desired, the total volume of both streams of fluid.

By thus diverting a substantial portion of the fluid before passing through the turbine, I am able to make said turbine of sufficiently small size to fit within the lower portion of the shell, so that the entire meter is compact and simple in form. Moreover, by properly positioning and proportioning the apertures 20 and 21 in the wall of the inner cylinder 15, the meter is rendered accurate for all variations in flow up to its maximum capacity. In this connection it should be stated that the area of the outlet 14 is preferably greater than the combined area of the apertures 20 and 21, so that no back-pressure is imposed upon the turbine, and the fluid is not forced up through the central tube 33 into the chamber 34 of the registering mechanism.

The fluid passages 22 are positioned opposite each other, as are the passages 23, so that the accuracy of the meter will not be impaired by a slight inclination from the vertical position. Such inclination, although increasing the head of the fluid at one side of the inner cylinder 15, would correspondingly decrease its head at the opposite side, so that although more fluid would pass into one of the passages 22 or 23, as the case may be, correspondingly less would pass into the opposite passage, and the ratio between the amounts flowing through both passages 22 and both passages 23 would remain constant.

I claim:—

1. A fluid meter comprising a tubular shell having an inlet and an outlet; a tubular member within said shell in spaced relation thereto, said member communicating with said inlet and having a plurality of relatively small apertures in its walls; substantially radial partitions dividing the space between said member and said shell into two separate fluid passages leading from said apertures to the outlet of said shell; and means for registering the amount of fluid passing through one of said passages.

2. A fluid meter comprising a tubular shell having an inlet and an outlet; a tubular member within said shell in spaced relation thereto, said member communicating with the inlet of said shell and being provided with a chamber at one end, and with apertures leading from its interior into the space between it and the shell to provide a free passage for the fluid from the inlet to the outlet of said shell, and said member being further provided with apertures forming a fluid passage from its interior through said chamber to the outlet of said shell; a rotor in said chamber operated by the fluid stream passing therethrough; and a registering device operated by said rotor.

3. A fluid meter comprising a shell having an inlet and an outlet; a tubular member within said shell in spaced relation thereto, said member communicating with the inlet of the shell, and provided with apertures leading from its interior into the space between it and the shell, and also provided with a chamber at one end; substantially radial partitions dividing said space into separate passages, one of said passages communicating directly with the outlet of the shell, and the other indirectly through the chamber of said member; a rotor in said chamber operated by the fluid stream passing therethrough; and a registering device operated by said rotor.

4. A fluid meter comprising a shell having an inlet at one end and an outlet at its other end; a member within the shell in spaced relation thereto, and communicating at one end with the shell inlet, and having at its other end a chamber communicating with the shell outlet, said member having apertures in its wall leading from its interior into the space between it and the shell, and having also other apertures leading from said space into the said chamber; partitions dividing said space into separate passages, one of which communicates with the shell outlet, and the other communicates through the last named apertures with the said chamber; a rotor in said chamber operated by the fluid stream passing therethrough; and a registering device operated by said rotor.

In testimony whereof I have signed my name to this specification.

RAY J. LYMAN.